W. M. C. MATHEWS.
Sleigh.
No. 60,765.
Patented Jan. 1, 1867.
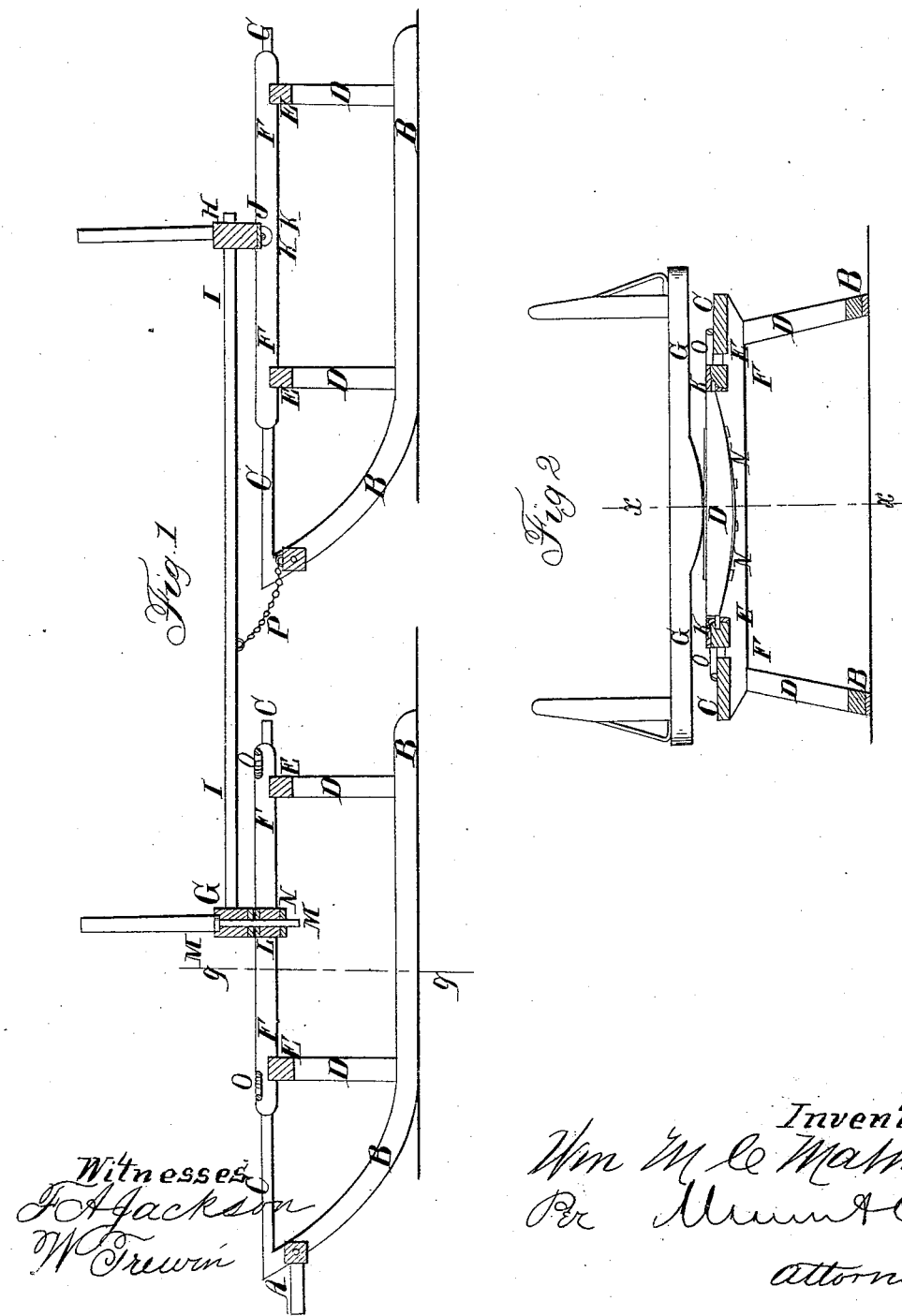

United States Patent Office.

WILLIAM M. C. MATHEWS, OF SUMMER HILL, PENNSYLVANIA.

Letters Patent No. 60,765, dated January 1, 1867.

IMPROVEMENT IN SLEIGHS.

*The Schedule referred to in these Letters Patent and making part of the same.*

TO ALL WHOM IT MAY CONCERN:

Be it known that I, WILLIAM M. C. MATHEWS, of Summer Hill, in the county of Crawford, and State of Pennsylvania, have invented a new and useful Improvement in Bob Sleigh; and I do hereby declare that the following is a full, clear, and exact description thereof, which will enable those skilled in the art to make and use the same, reference being had to the accompanying drawings, forming part of this specification, in which—

Figure 1 is a vertical longitudinal central section of a bob sleigh, illustrating my invention, taken through the line $x\,x$, fig. 2.

Figure 2 is a vertical cross-section of the same, taken through the line $y\,y$, fig 1.

Similar letters of reference indicate corresponding parts.

My invention consists in pivoting the bolsters to the bobs of the sleigh, as hereinafter more fully described, for the purpose of preventing said bolsters from moving backward and forward when the ends of the bobs go up and down. A is the tongue, B are the runners, C are the raves, D are the knees, and E are the beams of the sleigh, about the construction of which parts there is nothing new. F are bars or sticks of timber, securely attached to the upper sides of the beams E of the bobs, just inside of the raves C, as shown in figs. 1 and 2. G is the forward and H is the rear bolster, which are connected by the reach I in the ordinary manner. To the lower side of the rear bolster H, is attached an iron bar, J, the ends of which enter and work in bearings, K, attached to the bars or timbers F, as shown in fig. 1. L is the bar or timber that supports the forward bolster G, and to which the said bolster is connected by the king-bolt M. Iron plates may be attached to the under side of the bolster G, and to the upper side of the plank or timber L, where they come in contact with each other, to prevent wear. N is an iron bar, attached to the under side of the bar L, the ends of which enter and work in bearings, K, attached to the bars or timbers F. O is an iron circle for the ends of the bolster G to rest and slide upon when turning the sleigh. This circle O is attached to the upper sides of the bars or timbers F of the forward bob, as shown in figs. 1 and 2. P is the chain by which the forward end of the rear bob is connected to the reach I. By this improvement the bolsters G and H are kept steady, and prevented from moving backward and forward with the up and down movement of the ends of the bobs.

I claim as new, and desire to secure by Letters Patent—

1. Pivoting the bolsters of a bob sleigh to the bobs, substantially as herein shown and described.

2. The combination of the bars F, iron bar N, and bar or plank L, with each other, and with the beams E and bolsters G of the forward bob of the sleigh, substantially as herein shown and described.

3. The combination of the bars F and iron bar N with each other, and with the beams E and bolster H of the rear bob of the sleigh, substantially as herein shown and described.

WILLIAM M. C. MATHEWS.

Witnesses:
JAMES B. MATHEWS,
JOHN SPROUL.